United States Patent Office 3,766,121
Patented Oct. 16, 1973

3,766,121
VISCOSITY STABLE CHLOROPRENE/SULFUR POLYMER AND ITS PREPARATION
William Lee Fichteman, Louisville, Ky., assignor to E. I. du Pont de Nemours and Company, Wilmington, Del.
Continuation-in-part of application Ser. No. 126,363, Mar. 19, 1971. This application Aug. 30, 1972, Ser. No. 285,092
Int. Cl. C08d 7/00
U.S. Cl. 260—29.7 SO                14 Claims

ABSTRACT OF THE DISCLOSURE

Process for producing a viscosity stable chloroprene/sulfur polymer by polymerizing in aqueous emulsion in the presence of a dialkyl xanthogen disulfide and an alkali sulfite or alkali thiosulfate. Also chloroprene/sulfur polymer having improved viscosity stability prepared thereby.

CROSS REFERENCE TO RELATED APPLICATION

This application is a continuation-in-part of application Ser. No. 126,363, filed Mar. 19, 1971, now abandoned.

BACKGROUND OF THE INVENTION

This invention relates to a viscosity stable processable 2-chlorobutadiene-1,3/sulfur copolymer and its preparation.

So-called "sulfur-modified" chloroprene polymers which are really chloroprene-sulfur copolymers are known to be highly useful and versatile elastomers. They are commonly referred to as sulfur-modified neoprenes. Conventionally, such polymers are made by polymerizing chloroprene (i.e., 2-chlorobutadiene-1,3) in aqueous emulsion in the presence of elemental sulfur and permissibly another copolymerizable monomer containing a vinyl or vinylidene group (e.g., 2,3-dichlorobutadiene-1,3) to relatively high molecular weight so that the polymer is intractable and then, after removing unreacted chloroprene, adding plasticizing agents to the alkaline emulsion and aging it for several hours to peptize (cleave) the polymer to render it processable. The plasticizing agents, however, have an adverse effect on viscosity stability of the isolated polymer.

U.S. Pats. 3,397,173 and 3,378,538 disclose processes wherein dialkyl xanthogen disulfides can be added to the aqueous emulsion prior to polymerization in order to prevent the "sulfur-modified" neoprene from being prepared in intractable form, thereby eliminating the requirement to peptize the neoprene for further processing. Isolated neoprenes so prepared exhibit improved viscosity stability over prior art processes requiring use of plasticizing agents.

These copolymers, however, are still not as stable as desired in that changes in Mooney viscosity occur during copolymer storage after isolation from the aqueous emulsion. This viscosity instability occurs even during storage at normal ambient temperatures.

The degree of viscosity stability of the isolated sulfur-modified neoprene varies with emulsion holding time, with longer holding times generally resulting in isolated neoprenes having decreased viscosity stability. Heretofore, for optimum viscosity stability the copolymer has had to be isolated from aqueous emulsion within short time periods such as four hours. Moreover, the isolated neoprene has had to be handled with special precautions, taking care to process the isolated copolymer within limited time periods before unacceptable changes in viscosity occurred.

SUMMARY OF THE INVENTION

It has now been found that a 2-chlorobutadiene-1,3/sulfur copolymer (referred to as a chloroprene/sulfur copolymer) which is easily processed without peptization and which is highly stable against undesirable changes in viscosity regardless of aqueous emulsion aging time can be produced by polymerizing the monomers in aqueous emulsion in the presence of a small amount of alkali sulfite or thiosulfate in addition to conventional amounts of a $C_2$–$C_{16}$ dialkyl xanthogen disulfide. Polymers thus produced can be stored at normal room temperature of extended periods of time prior to copolymer isolation without unacceptable changes in viscosity after isolation. This improvement permits the isolated copolymer to be shipped for further processing without special precautions.

DETAILED DESCRIPTION OF THE INVENTION

Figure 1:
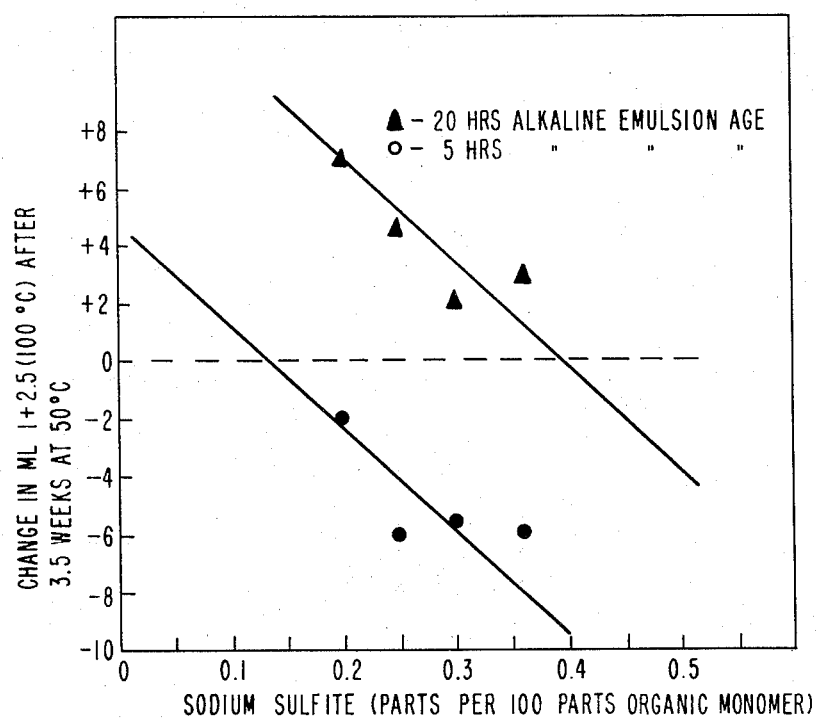
FIG. 1 represents a determination of optimum quantities of sodium sulfite added to stabilize copolymer at selected aqueous emulsion aging times under the conditions of Example 1.

Commercial production of "sulfur-modified" chloroprene copolymers usually involves holding the alkaline emulsion polymerization product for several hours after the polymerization is shortstopped. A very useful characteristic of the present invention is that the polymerization product can be held in alkaline emulsion for extended periods of time with practically no adverse effect upon the Mooney viscosity stability of the isolated product. Thus, copolymers of this invention can be held in alkaline emulsion at pH values of about 12 for at least 24 hours without imparting any substantial instability to the polymer ultimately isolated. This is in contrast to chloroprene/sulfur copolymers produced heretofore in the presence of alkyl xanthogen disulfides which require holding times in aqueous emulsion to be less than about four hours and preferably eliminated entirely to achieve a high level of Mooney viscosity stability for the isolated polymer. Since holding periods of less than about ten hours are impractical in commercial product of such chloroprene/sulfur copolymers, polymers of this type which can endure extended holding periods in alkaline dispersion form without adverse effect represent a substantial step forward.

In carrying out the process of this invention up to about 50% by weight of the chloroprene monomer can be replaced with another monomer containing olefinic unsaturation which is copolymerizable with the chloroprene. Satisfactory monomers copolymerizable with the chloroprene include those compounds containing the group $CH_2=C<$ of the following representative types: vinyl-substituted aromatic compounds such as styrene, vinyltoluenes, and vinylnaphthalenes; acrylic and methacrylic acids and derivatives thereof such as esters and nitriles, e.g., methyl methacrylate and acrylonitrile; and conjugated diolefinic compounds such as 1,3-butadiene, isoprene, and 2,3-dichloro-1,3-butadiene. Throughout this specification, the term "monomer" refers to total organic monomer used; the sulfur is not included in the monomer weight.

The polymerization is carried out in aqueous emulsion using any of the conventional free-radical polymerization catalysts. These include alkali metal or ammonium ferricyanides and peroxy compounds such as alkali metal or ammonium persulfates, hydrogen peroxide, cumene hydroperoxide, and dibenzoyl peroxide, and the like.

Any emulsifying agents conventional for polymerizing chloroprene can be used in preparing the monomer emulsion. These include water-soluble salts, particularly the sodium, potassium, and ammonium salts, of compounds of the following types: long-chain fatty acids; rosins or rosin derivatives, such as wood rosin, tall oil rosin, disproportionated rosin, or partially polymerized rosin; higher alcohol sulfates; arylsulfonic acids, such as nonylbenzenesulfonic acid; and formaldehyde condensates of arylsulfonic acids, such as the condensation product of formaldehyde and naphthalene sulfonic acid.

The concentration of organic monomers present in the aqueous emulsion during polymerization is not critical. In general, an initial concentration of 30-60 percent organic monomers by weight, based on the total weight of the emulsion, is used in the preparation of the sulfur-modified polymer.

It is preferred that the aqueous polymerization emulsion have an alkaline pH, preferably above 10, as is customary in the preparation of other sulfur-chloroprene copolymers. The polymerization can be carried out between 0° C. and 80° C., preferably between 40° and 50° C. Polymerization is conducted in an inert atmosphere free of oxygen, that is, in an atmosphere of nitrogen or other inert gas. It is preferred that polymerization be carried out to at least 85% monomer conversion.

Polymerization can be stopped at any time by use of conventional short-stop agents. Preferably, at least 0.05 part antioxidant per 100 parts copolymer is added to the emulsion promptly after the polymerization has stopped. The polymer can be isolated by conventional methods.

The amounts of sulfur and of the dialkyl xanthogen disulfide are critical in preparing a chloroprene/sulfur copolymer of satisfactory processability. The useful amounts of these two components are disclosed in U.S. 3,397,173. If too much sulfur is used, the polymer rapidly breaks down during processing in the presence of a peptizing agent to an unusable level of viscosity. If too little sulfur is used, the desirable features of the chloroprene/sulfur copolymer are lost; that is, the polymer cannot be plasticized to the desired degree. The operable range of sulfur to be used in practicing this invention ranges between 0.25 and 0.45 part by weight per 100 parts of organic monomer. These ranges of sulfur, however, produce polymers of satisfactory processability only when the polymerization system also contains a dialkyl xanthogen disulfide in the range defined under the definition. The amount of the different dialkyl xanthogen disulfides will vary somewhat with the molecular weight. However, for an unknown reason, there are small differences in modifying effectiveness among molecularly equivalent amounts of various dialkyl xanthogen disulfides. For this reason, the amount of dialkyl xanthogen disulfide has been defined in terms of the effective amount of diethyl xanthogen disulfide, which effective amount ranges from 0.25 to 0.45 part by weight per 100 parts of organic monomer. To determine the amounts of other dialkyl xanthogen disulfides equivalent to these amounts of diethyl xanthogen disulfide, one may, for example, plot the Mooney viscosities of polymers prepared in the presence of varying amounts of a particular dialkyl xanthogen disulfide while the amount of sulfur is kept constant. For this chart the amount of a given dialkyl xanthogen disulfide may be related to the equivalent amount of diethyl xanthogen disulfide. For example, instead of 0.25 to 0.45 part of diethyl xanthogen disulfide, one may use about 0.35 to about 0.58 part of diisopropyl xanthogen disulfide.

Preferably, an antioxidant is added to the chloroprene/sulfur copolymer before copolymer isolation although improved viscosity stability is achieved through addition of an alkali sulfite or thiosulfate alone. This is conveniently done by adding the antioxidant to the latex along with the short-stopping emulsion containing polymerization arresters such as phenothiazine, 4-tert-butylcatechol, 2,6-di-tert-butylhydroquinone, etc. The preferred amount ranges from 0.1 to 1 part. There is usually no advantage to be gained in adding any more than two parts of antioxidant. The amount of antioxidant so added is in addition to small amounts of antioxidant normally present in the short-stopping system.

Any secondary aromatic amine antioxidant or any phenolic antioxidant well known in the art may be used. Examples of suitable antioxidants include N-phenyl-1-naphthylamine,
N-phenyl-2-naphthylamine,
N,N'-diphenyl-p-phenylenediamine,
alkylated diphenylamines, such as octylated or nonylated diphenylamines,
p-isopropoxydiphenylamine,
di-2-naphthyl-p-phenylenediamine,
N-phenyl-N'-(p-toluenesulfonyl)-p-phenylenediamine,
2,2'-methylenebis(6-tert-butyl-p-cresol),
2,2'-methylenebis(6-tert-4-ethylphenol),
4,4'-butylidenebis(6-tert-butyl-p-cresol),
2,2'-methylenebis[(6-(1-methylcyclohexyl))-p-cresol],
2,6-di-tert-butyl-4-phenylphenol,
4,4'-thiobis(6-tert-butyl-m-cresol),
4,4'-thiobis(3,6-di-sec-amylphenol),
2,2'-thiobis(6-tert-butyl-p-cresol),
2,2'-thiobis(4,6-di-tert-butylphenol),
2,5-di-tert-amylhydroquinone,
(4-benzyloxyphenol),
p-lauroylaminophenol,
p-stearoylaminophenol,
2,6-di-tert-butyl-$\alpha$-dimethylamino-p-cresol,
2,4,6-tris(3,5-di-tert-butyl-4-hydroxybenzyl)mesitylene
and
2,4,6-tris(dimethylaminomethyl)phenol.

Viscosity of the isolated chloroprene/sulfur copolymer is conveniently expressed in terms of Mooney viscosity determined by following procedures of ASTM-D-1646-68. Mooney viscosity value is dependent on the time elapsed between starting the rotor motor and the time at which viscosity value is measured. Conveniently, this elapsed time is 2½ minutes.

Lower viscosity values are indicative of a polymer more readily processed on conventional equipment, such as a rubber mill. It is also desirable that the difference in Mooney viscosity value, as measured at 2½ and 10 minutes elapsed time ($\Delta$ML 2½-10), be large. A large $\Delta$ML 2½-10 is indicative of a polymer having favorable processing properties and requiring minimum energy for compounding on processing equipment.

It has now been found that isolated chloroprene/sulfur copolymers with improved Mooney viscosity stability and having a favorable $\Delta$ML 2½-10 are obtained if a water-soluble alkali sulfite or alkali thiosulfate is present in the aqueous emulsion during the copolymerization reaction. Any water-soluble alkali sulfite or alkali thiosulfate can be selected for this purpose but sodium, potassium, and ammonium sulfites and thiosulfates are preferred.

The quantity of alkali sulfite or thiosulfate necessary to achieve a desired degree of viscosity stability is dependent on aqueous emulsion holding time and temperature, and process variables such as degree of monomer conversion, polymer isolation conditions, quantity of antioxidant added, etc. By aqueous emulsion holding time is meant the time elapsed between copolymerization and isolation of resulting copolymer. Longer holding times require larger addition of alkali sulfite or thiosulfate to achieve a desired degree of viscosity stability. While the desired degree of copolymer stability will vary, it is generally desired that the isolated polymer have a Mooney viscosity which changes less than ±5 points upon aging six weeks at 50° C. Ideally, there will be no change in Mooney viscosity during these rigorous storage conditions.

Selection of the optimum amount of alkali sulfite or thiosulfate is readily determined for a predetermined emulsion holding time and temperature by adding varying amounts of the selected alkali sulfite or thiosulfate prior to polymerization, isolating the copolymer, and measuring viscosity stability of the isolated copolymer. By plotting the difference between Mooney viscosity of the freshly isolated copolymer and Mooney viscosity at a subsequent date, such as after storage for six weeks at 50° C., the optimum quantity of alkali sulfite or alkali thiosulfate is readily determined.

The relationship between emulsion holding time and optimum quantity of stabilizing additive is approximately linear at a constant holding temperature, other process conditions and parameters being the same. By plotting optimum quantity of alkali sulfite or thiosulfate for two emulsion holding times, a line can be generated which will approximate within 25% optimum quantities of stabilizing additive for other emulsion holding times. Example 1 illustrates such a determination.

The optimum quantity of alkali sulfite or alkali thiosulfate will generally be within the range of 0.07–0.35, and most usually 0.1–0.3, mol per 100 mols of organic monomer in the polymerization reaction mixture. When other than the optimum quantity is added, a lesser degree of stabilization will be observed. Quantities in excess of the optimum quantity will cause the Mooney viscosity to decrease during aging of the isolated copolymer. This is in contrast to additions below the optimum quantity, and in contrast to prior art copolymers, wherein the Mooney viscosity unfavorably increases. At all levels of addition, within the prescribed numerical range, the copolymer has a ΔML 2½–10 larger than in copolymers prepared from emulsions not containing sodium sulfite or thiosulfate. Most favorably, the ΔML 2½–10 value of copolymers stored six weeks at 50° C. after copolymer isolation will be more than eight. As used herein, "improved Mooney viscosity stability" includes improvement in ΔML stability.

The chloroprene/sulfur copolymers prepared according to this invention may be subsequently compounded, cured, and fabricated following general procedures for other types of chloroprene polymers. See, for example, Murray and Thompson, "The Neoprenes," Elastomer Chemicals Department, E. I. du Pont de Nemours and Company, 1963. Since the copolymers contain no plasticizing agent, as do the conventional chloroprene/sulfur copolymers, the plasticity of the polymers may be increased, if desired, by milling with conventional plasticizing agents such as alkyl or aryl mercaptans and thiuram disulfides. Tetraalkylthiuram disulfides not only serve as peptizing agents but increase the processing safety and act as accelerators for the cure.

This invention will now be described in and by the following examples of specific embodiments thereof wherein all parts and percentages are by weight unless otherwise indicated. Mooney viscosity measurements are taken after storage at 50° C. This temperature represents an extreme storage temperature and is selected as a test standard since changes in viscosity are accelerated at higher temperatures.

Example 1

A master solution is prepared of 1.6 parts sulfur, 16 parts wood rosin, and 1.46 parts diethyl xanthogen disulfide in 392 parts chloroprene and 8 parts 2,3-dichlorobutadiene-1,3. The master solution is divided into equal samples A, B, C, and D.

Samples A–D are then each emulsified with a solution of 0.75 part sodium hydroxide, 0.5 part sodium salt of the condensation product of naphthalene sulfonic acid with formaldehyde, and 0.30, 0.36, 0.25, and 0.20 part of sodium sulfite respectively in 115.3 parts of water. The emulsions are then each placed in 5-liter flasks, the temperature is brought to 40° C., and polymerization is initiated and maintained by the addition of a catalyst, which is a solution of 0.205 part potassium persulfate and 0.005 part of the sodium salt of anthraquinone β-sulfonic acid in 7.79 parts of water. The catalyst is added at a rate to maintain a fairly uniform rate of polymerization until the specific gravity of the emulsions reach 1.077 at 40° C. at which point the reactions are "short-stopped" by the addition of an emulsion of 0.0170 part sodium salt of the condensation product of naphthalene sulfonic acid with formaldehyde, 0.0484 part sodium salt of technical grade lauryl alcohol sulfate, 0.017 part phenothiazine, 0.0189 part p-tertiarybutylcatechol, 0.5 part 2,6-ditertiary-butyl-4-phenylphenol in 0.75 part toluene and 0.51 part of water. Solids content and conversion percents are given in Table I.

TABLE I

| Sample | A | B | C | D |
|---|---|---|---|---|
| Sodium sulfite [1] | 0.30 | 0.36 | 0.25 | 0.20 |
| Solids content, percent | 40.01 | 38.51 | 39.87 | 39.77 |
| Conversion, percent | 85.48 | 81.99 | 85.21 | 84.99 |

[1] Part per 100 parts organic monomer.

Immediately after "short-stopping," Samples A–D are stripped of unpolymerized chloroprene and other volatile components with steam at reduced pressure in a turbannular flow tube (described in U.S. Pat. 2,479,679) and then each sample is divided into two portions. The first portions are aged about 4½–5 hours at about 25° C., acidified with an aqueous solution of 30% acetic acid and 6% sodium salt of the condensation product of naphthalene sulfonic acid with formaldehyde to pH 5.6, isolated by freeze-coagulation and subsequent washing of the resultant polymer film, and dried by a stream of air in a festoon dryer at 125–135° C. to a moisture content of less than 1%. The second portions are aged about 20 hours at about 25° C., and then are recovered from aqueous alkaline emulsion using the same recovery procedures as were used with the first portions.

Mooney viscosities of the freshly recovered samples are determined at 2½ minutes following the procedures of ASTM D–1646-63. The same measurements are made on samples heat aged at 50° C. for 1, 3½, and 6 weeks. The values are given in Table II.

TABLE II

| Sample[1] | Emulsion aging time, hrs. at 25° C. | ML 1+2.5 (100° C.) Initial | weeks aging at, 50° C.[2] 1 | 3½ | 6 |
|---|---|---|---|---|---|
| A | 4½ | 70.0 | 72.0 +2 | 64.5 −5.5 | 63.0 −7 |
|  | 20 | 67.0 | 73.0 +6 | 69.5 +2.5 | 69.5 +2.5 |
| B | 4¾ | 74.0 | 74.5 +0.5 | 68.0 −6 | 67.0 −7 |
|  | 20 | [3] 69.0 | 75.0 +6 | 72.0 +3 | 68.0 −1 |
| C | 5 | 70.0 | 70.5 +0.5 | 64.0 −6 | 64.0 −6 |
|  | 20 | [3] 69.0 | 74.0 +5 | 73.5 +4.5 | 70.0 +1 |
| D | 5 | 67.5 | 70.5 +3 | 65.5 −2 | 65.0 −2.5 |
|  | 20 | 68.5 | 74.0 +5.5 | 75.5 +7 | 76.5 +8 |

[1] As identified in Table I.
[2] Plus and minus figures represent change from initial value.
[3] Represents average of 67.5 and 70.0.

To determine optimum quantity of sodium sulfite which should be added to the polymerization reaction emulsion, the change in Mooney viscosity reported in Table II is plotted as a function of sodium sulfite content in the emulsion at a fixed emulsion holding time and for a fixed raw polymer aging time and temperature. FIG. 1 illustrates such a plot for 5 and 20 hour alkaline emulsion aging times where the isolated raw polymer is aged for 3.5 weeks at 50° C.

Referring to FIG. 1, straight lines are generated from the plotted data using standard statistical methods. The optimum quantity of sodium sulfite, within 25%, is determined by observing the point at which these lines intersect the ordinate value representative of no change in Mooney viscosity. Optimum quantities are 0.135 phm. and 0.395 phm. sodium sulfite respectively for alkaline emulsion aging times of 5 and 20 hours under the conditions of FIG. 1.

Figure 2:
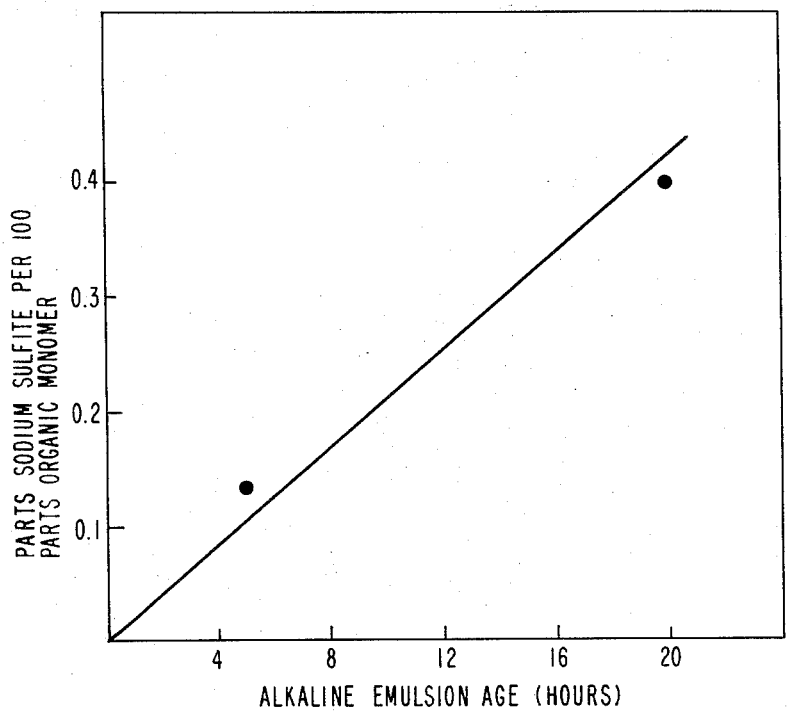
FIG. 2 represents a determination of optimum quantities of sodium sulfite added to stabilize copolymer for various aqueous emulsion aging times under the conditions of Example 1.

Referring to FIG. 2, the optimum quantities determined using FIG. 1 are plotted as a function of alkaline emulsion aging time. Polymer recovered from the aqueous emulsion immediately after polymerization has been "short-stopped" is known to be viscosity stable upon storing. Thus, a straight line is generated using the plotted data, which straight line passes through the origin. Optimum quantities of sodium sulfite, within 25%, are readily determined for various alkaline emulsion aging times using FIG. 2.

Example 2

A solution of 0.4 part sulfur, 4.0 parts wood rosin and 0.362 part diethyl xanthogen disulfide in 98 parts chloroprene and 2 parts 2,3-dichlorobutadiene-1,3 is emulsified with a solution of 0.75 part sodium hydroxide, 0.5 part sodium salt of the condensation product of naphthalene sulfonic acid with formaldehyde and 0.34 part sodium sulfite in 115.3 parts of water. The emulsion is placed in a 5-liter flask, the temperature is brought to 40° C. and polymerization is initiated and maintained by the addition of a catalyst, which is a solution of 0.205 part potassium persulfate and 0.005 part of the sodium salt of anthraquinone beta-sulfonic acid in 7.79 parts of water. The catalyst is added at a rate to maintain a fairly uniform rate of polymerization until the specific gravity of the emulsion reaches 1.076 at 40° C. at which point (85% conversion) the reaction is "short-stopped" by the addition of an emulsion of 0.0170 part sodium salt of the condensation product of naphthalene sulfonic acid with formaldehyde, 0.0484 part sodium salt of technical grade lauryl alcohol sulfate, 0.017 part phenothiazine, 0.0189 part p-tertiary butylcatechol, 0.5 part 2,6-ditertiarybutyl-4-phenylphenol in 0.75 part toluene and 0.51 part of water. After cooling to 25° C. and aging at that temperature for four hours, the polymer latex is stripped of unpolymerized chloroprene and other volatile components with steam at reduced pressure in a turbannular flow tube (described in U.S. Pat. 2,479,679). The stripped latex is then aged 16 hours at about 25° C., acidified with an aqueous solution of 30% acetic acid and 6% sodium salt of the condensation product of naphthalene sulfonic acid with formaldehyde to pH 5.6, isolated by freeze-coagulation and subsequent washing of the resultant polymer film and dried by a stream of air in a festoon dryer at 125–135° C. to a moisture content of less than 1%.

The isolated polymer is then heat-aged at 50° C. and the Mooney viscosity ML 1+2.5 (100° C.) (ASTM-D-1646-68) is determined weekly on raw polymer and Mooney scorch time (MS–121° C.), minutes to 5 point rise is determined weekly over a six-week aging period on polymer compounded on a 50° C. rubber mill using the following recipe:

| | Parts |
|---|---|
| Polymer | 100.00 |
| Bis(diethylthiocarbamoyl disulfide) | 2.00 |
| Diphenylguanidine | 0.25 |
| Phenyl-alpha-naphthalamine | 2.00 |
| Magnesium oxide | 4.00 |
| Zinc oxide | 5.00 |
| Mercaptoimidazoline | 0.25 |

The ML 1+2.5 (100° C.) and MS–121 values of the above polymer made with sodium sulfite are compared to similar polymers (control) prepared without sodium sulfite and treated in an identical fashion and compounded according to the recipe specified. The results are given in Tables III and IV.

TABLE III.—CHANGE IN MOONEY VISCOSITY (ML–100) UPON HEAT AGING AT 50° C.

| | Polymer prepared with sulfite in water solution | Control polymer (no sulfite) |
|---|---|---|
| ML 1+2.5 (100° C.): | | |
| Initial | 74.5 | 62.5 |
| After 1 week | 72.0 | 69.0 |
| After 3 weeks | 74.5 | 78.0 |
| After 6 weeks | 73.5 | 83.5 |
| Net change | –1.0 | +21.0 |

TABLE IV.—CHANGE IN MOONEY SCORCH (MS–121[1]) UPON HEAT AGING AT 50° C.

| | Polymer prepared with sulfite in water solution | Control polymer (no sulfite) |
|---|---|---|
| MS–121: | | |
| Initial | 32.0 | 32.5 |
| After 1 week | 28.5 | 30.0 |
| After 3 weeks | 21.5 | 20.5 |
| After 6 weeks | 25.5 | 20.0 |
| Net change | –6.5 | –12.5 |

[1] Minutes to 5-point rise.

Example 3

Polymers are prepared according to the recipe and procedure in Example 2 with the following exceptions:

| Sample | 3A | 3B |
|---|---|---|
| Sodium sulfite, part | 0.360 | None |
| Diethylxanthogen disulfide, part | 0.362 | 0.375 |
| Final specific gravity | 1.077 | 1.076 |
| Unstripped aging time, hours | 2 | 2 |
| Stripped aging time, hours | 18 | 18 |

Viscosity stability data are given in Tables V and VI:

TABLE V.—CHANGE IN MOONEY VISCOSITY (ML–100) UPON HEAT AGING AT 50° C.

| | 3A—Polymer prepared with sulfite added to water solution | 3B—Control polymer (no sulfite) |
|---|---|---|
| ML 1+2.5 (100° C.): | | |
| Initial | 70.0 | 67.5 |
| After 1 week | 69.5 | 75.0 |
| After 3 weeks | 68.0 | 81.0 |
| After 6 weeks | 69.0 | 83.0 |
| Net change | –1.0 | +16.5 |

TABLE VI.—CHANGE IN MOONEY SCORCH (MS–121)[1] UPON HEAT AGING AT 50° C.

| | 3A—Polymer prepared with sulfite added to water solution | 3B—Control polymer (no sulfite) |
|---|---|---|
| MS–121: | | |
| Initial | 27.0 | 28.0 |
| After 1 week | 26.0 | 27.0 |
| After 3 weeks | 26.0 | 26.0 |
| After 6 weeks | 20.5 | 17.5 |
| Net change | –6.5 | 10.5 |

[1] Minutes to 5-point rise.

Example 4

Polymers are prepared according to the recipe and procedure of Example 2 except that sodium sulfite or thiosulfate is added after polymerization is completed in two of the runs. Mooney viscosity measurements are taken on the freshly isolated polymers, and after storage at 50° C. for one and three weeks. Results are recorded in Table VII. Samples 94A and C are prepared by adding the indicated quantities of alkali salt to the water solution prior to polymerization. Sample 94A demonstrates that improved stability of ΔML (2½–10) results even when sodium sulfite is not present in optimum quantities. Samples 94B and D demonstrate that addition of sodium sulfite or thiosulfate after polymerization has been completed is not effective to improve viscosity stability of isolated polymer.

TABLE VII

| Sample | Added salt [1] | ML 2½ (100° C.) after aging at 50° C. | | | ΔML 2½-10 (100° C.) after aging at 50° C. | | |
|---|---|---|---|---|---|---|---|
| | | Initial | 1 week | 3 weeks | Initial | 1 week | 3 weeks |
| 94A | 0.36 phm. sodium sulfite added to water solution | 79.0 | 73.0 | 70.5 | 18.0 | 18.0 | 15.5 |
| 94B | 0.36 phm. sodium sulfite added to emulsion after shortstopping [2] | 78.0 | 83.5 | 90.5 | 13.0 | 10.0 | 3.0 |
| 94C | 0.52 phm. sodium thiosulfate added to water solution | 75.5 | 73.0 | 73.5 | 16.0 | 10.0 | 13.0 |
| 94D | 0.52 phm. sodium thiosulfate added to emulsion after shortstopping [3] | 77.0 | 91.0 | 89.0 | 11.0 | 18.0 | 5.5 |

[1] phm.=parts per 100 parts organic monomers.
[2] Added as an aqueous solution containing 6.59 g. sodium sulfite, 0.13 g. "Lomar" PW and 100 g. water.
[3] Added as an aqueous solution containing 9.3 g. sodium sulfite, 0.19 g. "Lomar" PW and 100 g. water.

I claim:
1. In the process for producing a 2-chloro-butadiene-1,3-sulfur copolymer by polymerizing, in alkaline aqueous emulsion, 100 parts by weight of 2-chloro-butadiene-1,3, and 0.25 to 0.45 part by weight of sulfur in the presence of an effective amount of a $C_2$–$C_{16}$ dialkyl xanthogen disulfide equivalent to 0.25 to 0.45 part by weight of diethyl xanthogen disulfide, the improvement wherein 0.07 to 0.35 mole of alkali sulfite or alkali thiosulfate is also present in the polymerization reaction mixture per 100 moles of organic monomers.

2. The process of calim 1 wherein up to about 50 parts by weight of 2-chloro-butadiene-1,3 are replaced with a monomer having olefinic unsaturation and copolymerizable with 2-chlorobutadiene-1,3.

3. The process of claim 2 in which the copolymer is a chloroprene/sulfur/2,3 - dichlorobutadiene-1,3-copolymer having unit weight proportions 95–100/0.25–0.45/5–0, respectively, per 100 parts of organic monomer units.

4. The process of claim 1 wherein alkali sulfite or thiosulfate is present in an amount which produces copolymer having a change in ML 1+2.5 (100° C.) of less than about 5 during the first 6 weeks following copolymer isolation, said copolymer being maintained at about 50° C. during said 6 weeks.

5. The process of claim 4 wherein a sodium, potassium, or ammonium sulfite or thiosulfate is present in the alkaline aqueous emulsion.

6. The process of claim 4 wherein 0.1–0.3 mol of sodium sulfite or thiosulfate is present per 100 mols of organic monomer.

7. The process of claim 4 in which the copolymer is a chloroprene/sulfur/2,3 - dichlorobutadiene-1,3-copolymer having unit weight proportions 95–100/0.25–0.45/5–0, respectively, per 100 parts of organic monomer units.

8. A 2-chloro-butadiene-1,3/sulfur copolymer in aqueous emulsion, said aqueous emulsion containing an effective amount of alkali sulfite or thiosulfate added prior to polymerization to improve the Mooney viscosity stability of the copolymer when isolated from said aqueous emulsion.

9. The composition of claim 6 wherein alkali sulfite or thiosulfate is present in an amount which produces copolymer having a change in ML 1+2.5 (100° C.) of less than about 5 during the first 6 weeks following copolymer isolation from said aqueous emulsion, said copolymer being maintained at about 50° C. during said 6 weeks.

10. The composition of claim 9 containing sodium, potassium, or ammonium sulfite or thiosulfate.

11. The composition of claim 8 wherein 0.1–0.3 mol of sodium sulfite or thiosulfate is present per 100 mols organic monomer precursor of said polymer.

12. The product prepared by the process of claim 1.
13. The product prepared by the process of claim 4.
14. The product prepared by the process of claim 6.

References Cited
UNITED STATES PATENTS

| 3,397,173 | 8/1968 | Collette et al. | 260—45.9 |
| 3,317,451 | 5/1967 | Apotheker | 260—79 |
| 3,105,055 | 9/1963 | Aho | 260—79.5 R |
| 3,686,156 | 8/1972 | Hagman | 260—92.3 |
| 3,472,828 | 10/1969 | Montgomery | 260—92.3 |
| 3,300,433 | 1/1967 | Apotheker | 260—92.3 |
| 3,378,538 | 4/1968 | Sparks | 260—79 |
| 3,318,832 | 5/1967 | Sparks | 260—92.3 |

DONALD E. CZAJA, Primary Examiner

MELVYN I. MARQUIS, Assistant Examiner

U.S. Cl. X.R.

260—79, 79.5 R, 79.5 C, 12.3